Feb. 9, 1960 F. ERNEST 2,924,447
COMPENSATING SPRING DEVICES
Filed May 12, 1958 4 Sheets-Sheet 1
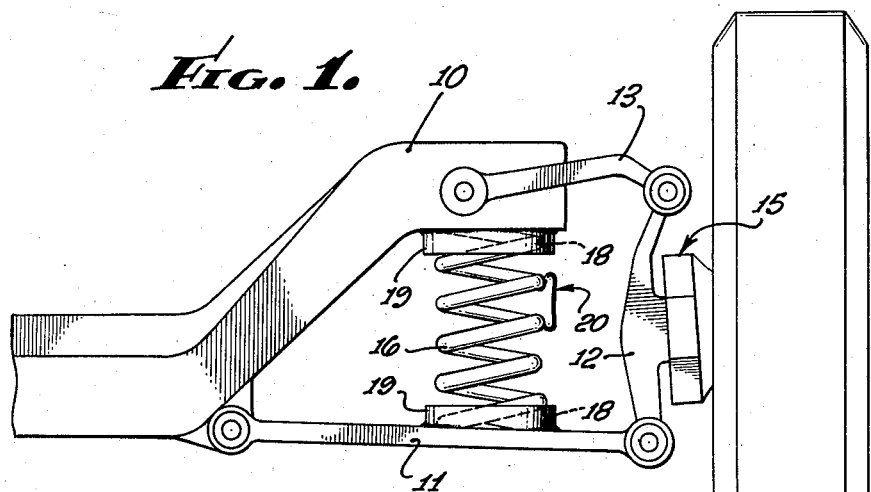
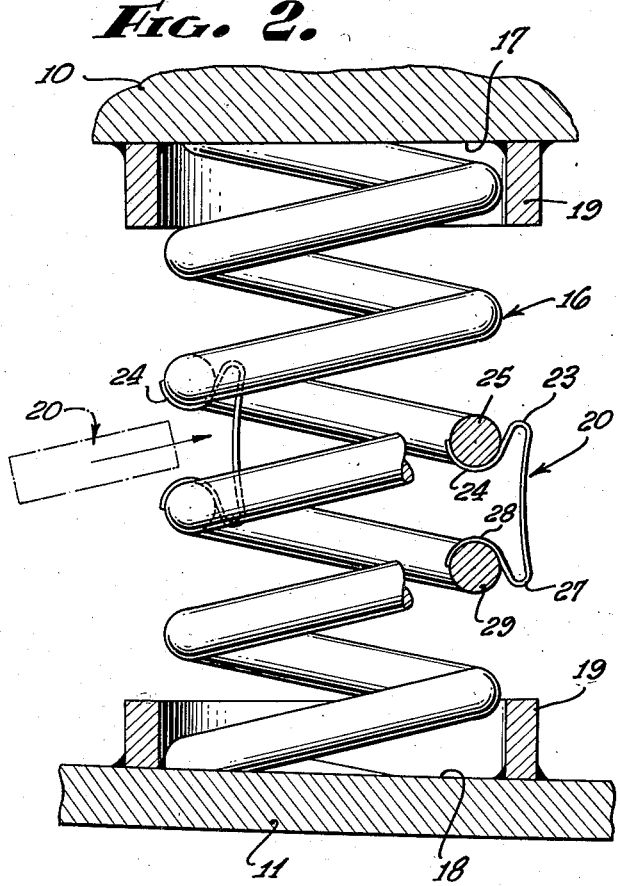
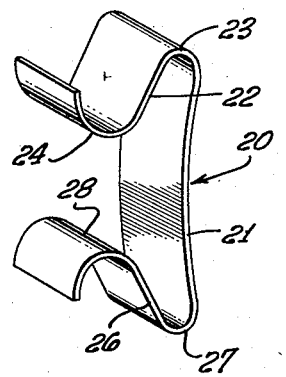
INVENTOR.
FRED ERNEST
BY
Bernard Kriegel
ATTORNEY.

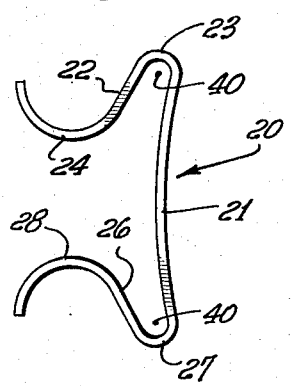
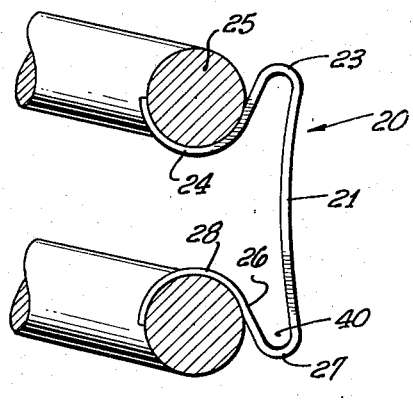
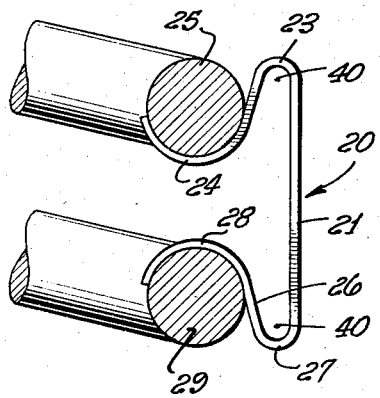
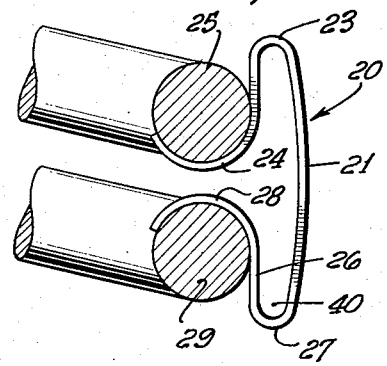
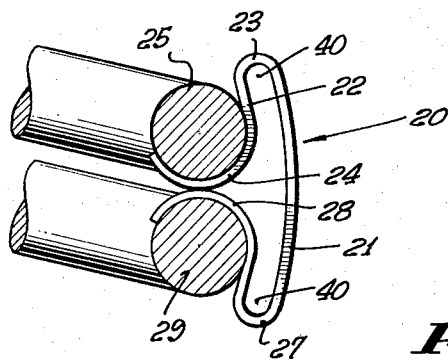

Feb. 9, 1960 F. ERNEST 2,924,447
COMPENSATING SPRING DEVICES
Filed May 12, 1958 4 Sheets-Sheet 3

INVENTOR.
FRED ERNEST
BY
Bernard Kriegel
ATTORNEY.

Feb. 9, 1960 F. ERNEST 2,924,447
COMPENSATING SPRING DEVICES
Filed May 12, 1958 4 Sheets-Sheet 4
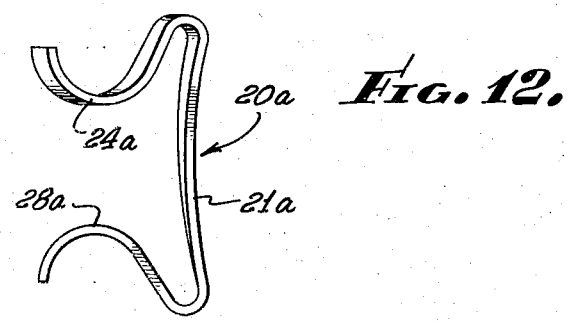
FIG. 12.
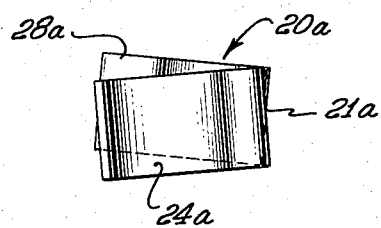
FIG. 13.
FIG. 14.
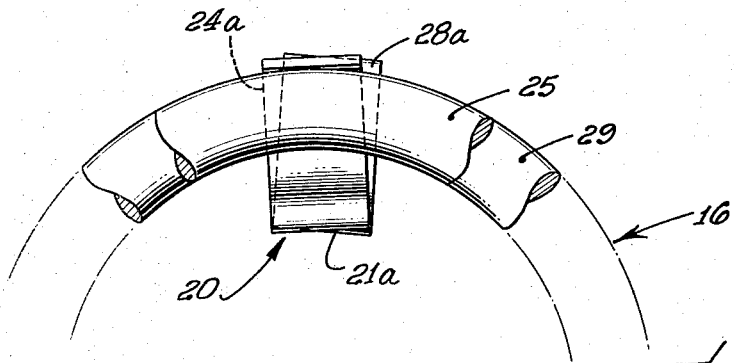
INVENTOR.
FRED ERNEST
BY
Bernard Kriegel
ATTORNEY.

United States Patent Office 2,924,447
Patented Feb. 9, 1960

2,924,447

COMPENSATING SPRING DEVICES

Fred Ernest, Los Angeles, Calif.

Application May 12, 1958, Serial No. 734,548

10 Claims. (Cl. 267—28)

The present invention relates to spring devices, and is more particularly directed to a booster or compensating spring for use in conjunction with coil springs forming part of the suspension system of automobiles.

The over-all height of a coil spring, such as used in automobiles, may decrease after the spring has been subjected to sustained loads, as a result of the spring taking an additional permanent set. When used in an automobile, such shortening of height of one or more of the springs results in sagging of the vehicle, improper alignment of its wheels, inability of the spring suspension system to properly support normal loads, and, in general, impairs the riding qualities of the vehicle.

An object of the present invention is to provide a compensating spring adapted to be applied to a coil spring to restore it to its initial height.

Another object of the invention is to provide a booster spring adapted to be applied to a coil spring for the purpose of increasing its load carrying capacity.

A further object of the invention is to provide a booster or compensating spring adapted to be applied to the coils of a coil spring, the booster or compensating spring having a variable spring rate. The booster or compensating spring has a relatively high spring rate under low loads, but a lesser spring rate under high loads so that the coil spring and booster spring combination is not too stiff, thus avoiding impairing the riding qualities of the vehicle in which the combination is used.

Another object of the invention is to provide an improved spring having a variable rate. More specifically, the spring has a high rate during its initial compression, the spring being more readily deflectable as additional load is applied.

An additional object of the invention is to provide an auxiliary spring to be applied to the coils of a coil spring, such as an automobile coil spring, the auxiliary spring occupying a minimum amount of space, thereby avoiding interference with the vehicle frame and other vehicle parts adjacent to the coil spring.

Yet another object of the invention is to provide an auxiliary spring to be applied to the coils of a coil spring, which can be installed through the space between adjacent coils and located internally of the coil spring. Such internal location does not interfere with mechanism, such as a shock absorber, disposed within the coil spring.

Still a further object of the invention is to provide an auxiliary spring to be applied to the coils of a coil spring having a relatively high load carrying capacity, a comparatively wide range of deflection, and which can be made from a comparatively small amount of material.

Another object of the invention is to provide an auxiliary spring to be applied to the coils of a coil spring, such as the spring of an automobile suspension system, in which the auxiliary spring creates a damping effect in the suspension system returning the latter to a condition of equilibrium in lesser time, thereby maintaining the wheels of an automobile in constant contact with the contour of the road.

A further object of the invention is to provide an auxiliary spring to be applied to and supported by the turns or coils of a coil spring, in which the auxiliary spring retains itself in its position of installaton on the coil spring, and does not shift or creep around the turns of the coil spring during contraction and elongation of the springs under varying load conditions.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

Figure 1 is a front elevational view of the suspension system of an automobile vehicle, a portion thereof being disclosed in simplified fashion for purposes of clarity;

Fig. 2 is an enlarged longitudinal section, partly in side elevation, of the coil spring arrangement shown in Fig. 1, with a booster or compensating spring attached thereto;

Fig. 3 is an isometric projection of one form of booster or compensating spring used in conjunction with the coil spring;

Fig. 4 is a side elevation of the spring shown in Fig. 3 under no-load condition;

Fig. 5 is a view similar to Fig. 4 illustrating the auxiliary spring applied to the coils of a coil spring and with a light load applied thereto;

Fig. 6 is a view similar to Fig. 5 with a greater load applied to the auxiliary spring;

Fig. 7 is a view similar to Fig. 5 with still a greater load applied to the auxiliary spring;

Fig. 8 is a view similar to Fig. 5 illustrating the condition of the auxiliary spring when the coil spring has been collapsed to substantially its solid height;

Fig. 12 is a side elevation of another form of auxiliary spring;

Fig. 13 is an end elevation of the spring shown in Fig. 12;

Fig. 14 is an end view illustrating the auxiliary spring of Figs. 12 and 13 installed on the helical compression spring.

Figure 9:
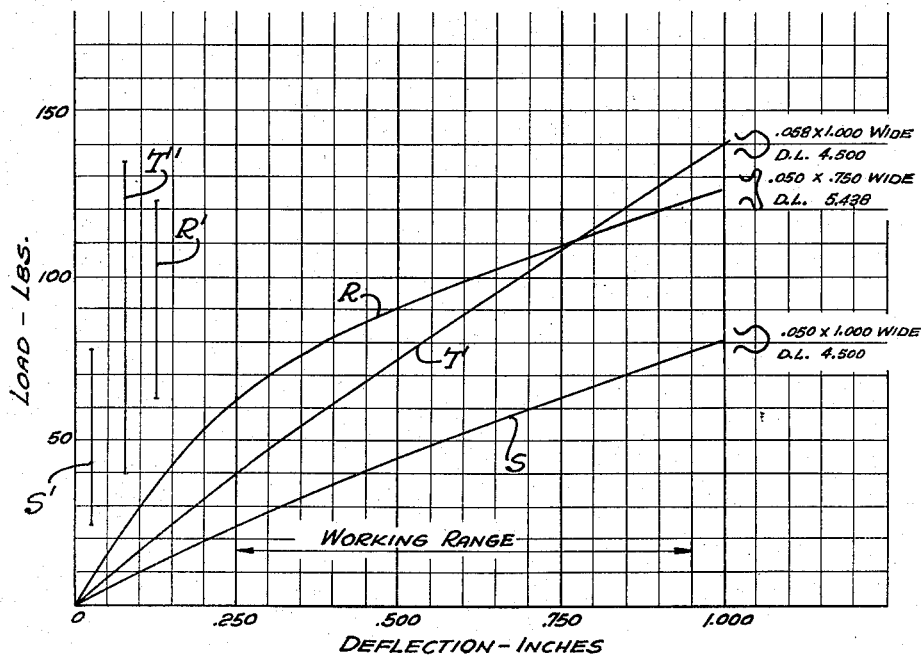
Fig. 9 is a graph representing the relation between the force applied to different springs and the deflection of such springs.

The invention is disclosed in the drawings, by way of example, as being applied to the suspension system of an automotive vehicle. More specifically, it is disclosed in conjunction with the front suspension system of the vehicle. As shown, the chassis front cross member 10 has a lower control arm 11 pivotally connected thereto, the outer end of which is pivotally connected to the lower portion of a steering knuckle support 12. The upper portion of such support is pivotally attached to the outer end of an upper control arm 13, which is, in turn, pivotally connected to the chassis cross member 10. A front wheel 14 of the vehicle is suitably supported by the steering knuckle support 12 through the agency of the usual knuckle and king pin arrangement 15. A helical coil spring 16, which may be mounted made of round wire of the proper diameter, is disposed between the front cross member 10 and the lower control arm 11. The upper end of the spring bears against an upper spring seat 17 provided by the cross member 10, its lower end bearing upon a lower seat 18 provided on the lower control arm 11. The spring 16 is held in proper centered condition, and is retained in appropriate relation on the cross member 10 and control arm 11 by upper and lower centering members 19 which are suitably secured to the cross member and the lower control arm. The illustrations in Figs. 1 and 2 are somewhat diagrammatic, since portions of the vehicle, other than the upper and lower centering members 19 may be disposed closely adjacent to the helical compression spring 16. For that matter, in some types of vehicles, a shock absorber device is mounted within the helical spring 16.

During use of the vehicle, the spring 16 is subjected to a variety of loads, ranging from a static load while the vehicle is at rest or under a constant load, to intermittent increases and decreases in load resulting from the movement of the vehicle over a road surface, particularly when such road surface is not uniform, possessing a series of ruts and bumps. In the use of the vehicle under varying conditions, the helical suspension spring, instead of retaining a desired over-all height under the usual static load applied to it, sags to some extent so that such desirable over-all height is decreased. Since all of the springs in the vehicle spring suspension system do not decrease in height to the same extent, the result is a tilting of the frame or chassis of the vehicle which is conducive to the production of excessive wear on the wheel supporting and steering mechanism, producing incorrect caster, camber, toe-in and toe-out of the front wheels of the vehicle. It also results in the reduction in the maximum load that each spring can carry before being collapsed to a solid height, or a distance in which the bumper members, carried by the control arm 11 and the chassis 10 will engage. This results in "bottoming" of the vehicle during its movement over the road surface, which is uncomfortable and disconcerting to the occupants of the vehicle.

In the present invention, an auxiliary spring device 20 is applied to the coils of the coil spring 16 to restore the latter to its initial static height. As specifically illustrated in the drawings, the auxiliary spring 20 is of generally U-shape in side elevation, including a longitudinal deflectable central web or column 21, the upper end of which is attached to a bendable arm 22 through an interconnecting portion 23 which is convex in an outward direction and which has a relatively small radius of curvature. The bendable arm 22 extends inwardly from the curved interconnecting portion, the outer part of the bendable arm being constituted as a concave saddle or bearing portion 24 adapted to receive a coil or turn 25 of the helical compression spring 16. The lower end of the central web 21 is also connected to a lower bendable arm 26 through a lower interconnecting portion 27, the lower bendable arm extending inwardly toward the other bendable arm 22 with its outer part being formed as a downwardly concave saddle or bearing portion 28 adapted to receive a coil or turn 29 of the helical compression spring 16. Actually, the upper bendable arm 22 and interconnecting portion 23 are the same as the lower bendable arm 26 and lower interconnecting portion 27, these parts being opposite one another, the upper saddle 24 being adapted to receive an upper coil 25 of the helical spring 16 and the lower saddle 28 being adapted to receive a lower coil 29 of the helical spring. The spring 20 may be formed into the desired shape from suitable strip material of the proper width, thickness and length, the strip material being spring steel or other suitable material subjected to the appropriate heat treatment.

The upper and lower saddles 24, 28 are spaced a substantial distance from one another when the auxiliary spring 20 is under no load. Such spacing is greater than the distance between adjacent coils 25, 29 of the helical compression spring when the latter is under a static load, requiring that the saddle portions of the spring 20 be forced toward each other for insertion of the spring 20 in position on the helical spring 16, with an upper coil 25 being received within the upper saddle 24 and a lower coil 29 within the lower saddle 28. The auxiliary spring 20 or a plurality of auxiliary springs 20, that may have been mounted on the helical spring 16, will exert an elevating force on the coils in the spring, separating adjacent turns of the coil spring 16 and resulting in an elevation of the spring to the desired over-all height.

As the load on the helical spring 16 increases, it is compressed or shortened in height, the adjacent turns 25, 29 being shifted toward one another and causing the saddle portions 24, 28 to be moved toward one another to the extent limited by engagement of the saddles with one another. As the load is released, the auxiliary spring 20 will add its spring force in shifting the helical coil spring 16 back to its initial statically loaded height.

Figure 10:
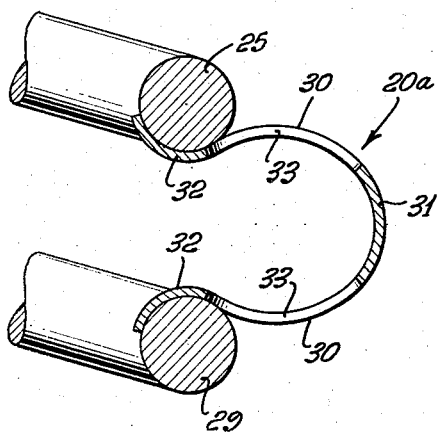
Fig. 10 is a section through another form of auxiliary spring applied to the coils of a coil spring.
Figure 11:
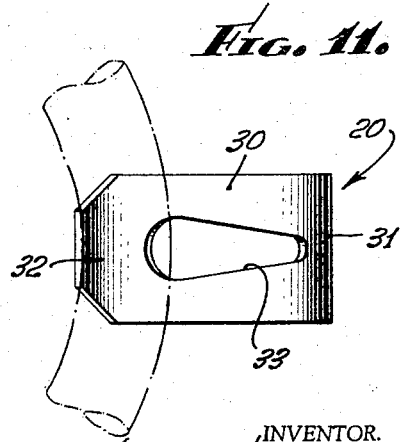
Fig. 11 is a top plan view of the auxiliary spring disclosed in Fig. 10.

In the form of the invention illustrated in Figs. 10 and 11, the auxiliary spring 20a is shaped differently from the spring 20 illustrated in Figs. 1 to 8, inclusive. Thus, the spring 20a, which is also of a general U-shape, has a pair of opposed arms 30, 30 integral with a web or central portion 31 of the spring, the arms 30 being generally convex in an outward direction, except at their inner saddle portions 32, where they are concave in order to receive the upper and lower turns 25, 29 of the spring 16. To prevent the spring 20a from being too stiff, and to improve its spring characteristics, the arms 30 may have opposed openings 33 formed therein, which will make the springs more deflectable as the applied load increases. As in the other form of invention, a plurality of the auxiliary springs 20a may be used, appropriately spaced around the helical compressed spring 16. Thus, if two springs are employed, they are applied between the same turns 25, 29 of the helical spring 16, but preferably displaced about 180° apart. If four springs are used, they may be provided substantially 90° apart, or a pair of diametrically opposed springs may be applied between two adjacent turns of the helical compression spring 16 and two other diametrically opposed springs may be disposed between two other adjacent turns of the helical spring 16, this latter pair of springs 20a being displaced 90° from the first-mentioned pair.

The auxiliary springs can exert an appropriate spring force as to restore the helical spring 16 to its initial height under normal static load conditions. The auxiliary springs will, in effect, relieve the coils 25, 29 through and between which they are applied of some of the load, since a portion of the load will pass from one coil 25 through each auxiliary spring 20 or 20a to the next coil 29. However, they will still permit the coils 25, 29 to which they are applied to transmit the spring torque and deflect toward one another. In fact, such coils can bottom without exceeding the elastic limit of the auxiliary spring 20 or 20a, which, when the applied load is relieved, will return to their initial statically loaded position, along with the return of the helical spring 16 to its initial position, in which its over-all height is the desired value.

The auxiliary springs 20 or 20a are not only usable with helical springs 16 that have sagged or taken an additional permanent set, for the purpose of restoring such spring to the initial desired height, but they can also be used as booster springs, an appropriate number being placed between adjacent turns of the helical compression spring 16 when the latter is subjected to an increased static load. The booster spring or springs 20 or 20a will restore the over-all height of the helical spring 16 to the proper value despite being subjected to an increased static load, thereby preventing undesirable effects on the vehicle, such as improper alignment of its wheels, wear in the steering mechanism, and the like.

It is desired to restore the helical compression spring 16 to a particular height under the static load applied to it and yet avoid too great a combined helical spring 16 and compensating spring force being exerted when heavy loads are applied. If the auxiliary spring has a constant spring rate, and if it were to exert the proper spring force under static load conditions, it would exert a very high spring force when the load applied thereto is increased, resisting deflection to an increasing extent and making the combination of the main helical coil spring 16 and the auxiliary spring relatively stiff. The result would be hard riding of the vehicle, since a much greater spring force is available to resist deflection of each auxiliary spring. By virtue of the present invention, such undesirable result is prevented since the auxiliary spring 20 has a relatively high spring rate when inserted between adjacent coils 25, 29 of the main spring 16 and subjected to static loads, but in which the spring 20 is more readily deflectable as the load applied thereto increases. In other words, the spring rate of the auxiliary spring 20 is initially comparatively high, but decreases as the load applied thereto increases.

It is to be noted that the deflectable central web 21 is concave in an outward direction when the auxiliary spring is under no-load or light load (Figs. 4, 5). As the load applied to the spring arms 22, 26 increases, such arms move toward one another and tend to bend substantially about the center or axis of curvature 40 of the interconnecting portions 23, 27. This bending action of the arms 22, 26, as they are moved toward one another, deflects the central web 21 outwardly until it achieves the relatively straight shape illustrated in Fig. 6. As the applied load continues to increase, the arms deflect about the axis or curvature 40 of the interconnecting portions 23 to a still further extent, with the saddle portions 24, 28 and the interconnecting portions 23, 27 moving toward each other, then bending the deflectable web 21 in an outward direction in which it assumes the convex shape illustrated in Fig. 7. The degree of curvature of the convex portion 21 will be a maximum when the saddle portions 24, 28 of the arms contact one another as when the main coil spring 16 has been compressed to substantially a solid height.

The result of providing the auxiliary spring with the shape shown in Figs. 1 to 8 is that the spring 20 is relatively stiff under light load conditions, or has a comparatively high spring rate, and when inserted between the coils 25, 29 and subjected only to the static load applied to the main spring 16 it will restore the spring 16 to the required initial statically loaded height. As the load on the main spring 16 increases, a portion of such increased load is also imposed upon the auxiliary spring 20, but the force required to deflect such auxiliary spring a given amount in moving the saddle portions 24, 28 toward each other decreases. By reference to the graph shown in Fig. 9, the curve R represents the relationship between the applied load on a typical auxiliary spring 20 illustrated in Figs. 1 to 8, inclusive, in relation to the deflection of such spring or the distance between the saddle portions 24, 28 of the arms 22, 26.

In the example depicted in curve R, the saddle portions 24, 28 were deflected toward each other about a quarter of an inch when installed between adjacent coils 25, 29 of the main spring 16 of an automobile under which deflecting condition the spring 20 exerted a force of about 62 pounds. Such a static condition is the beginning of the working range of the spring 20. As the load on the spring 20 is increased and the deflection to bring the saddle portions 24, 28 closer to one another increased to about a half inch, the restoring force exerted by the auxiliary spring was about 90 pounds. With a deflection of about three quarters of an inch the restoring force was about 110 pounds, and with a deflection of about one inch the force exerted by the auxiliary spring was about 125 pounds.

It is thus evident that the spring 20 has a relatively high rate under low load conditions, but that the rate of the springs changed and actually decreased as the load increased. Thus, the desired restoring force under the static load conditions is provided without producing a stiff, relatively non-yielding main and auxiliary spring combination as the load on the springs increased as occurs intermittently during movement of a vehicle over the road. If the auxiliary spring 20 had a constant spring rate, then it would have exerted a force at a deflection of one half inch of about 124 pounds, at three quarters of an inch of about 186 pounds, and at one inch of about 248 pounds. Assuming by way of example that four auxiliary spring units 20 were mounted on a single main spring 16, the maximum force applied would be about 500 pounds, under the specific example given in connection with curve R; whereas it would have been about 1,000 pounds if the spring rate of the auxiliary spring were constant, and if each uniform rate spring were capable of exerting a force of 62 pounds under static load conditions. Quite obviously, the spring with the constant rate would have been entirely too stiff and would have been unacceptable as a practical matter.

The characteristics of the auxiliary spring 20 illustrated in Figs. 1 to 8, inclusive, can be compared with the springs 20a illustrated in Figs. 10 and 11, in which two specific types are illustrated in curves S and T on Fig. 9. In curve S, the spring 20a is made of material having thickness of five hundredths of an inch and is one inch wide. The spring rate is substantially constant. Thus, with a quarter of an inch deflection it exerts a force of about 25 pounds; whereas at one inch deflection it exerts a force of about 80 pounds. Here, the force applied when the main spring 16 is subjected to static load only is rather small, while the force applied under maximum deflection of one inch is also relatively low. The spring depicted in curve S has some beneficial effect in restoring the main spring 16 to its initial height, but a relatively large number of such springs would be required to achieve the desired result.

The spring represented by curve T is shaped along the same lines as the one shown in Figs. 10 and 11, being made of material 58 thousandths of an inch thick and one inch wide. This spring exerts a force of 40 pounds when deflected one quarter of an inch and about 140 pounds when deflected to the maximum extent of about one inch. The initial desired deflection is much lower than secured with the spring illustrated in Figs. 1 to 8, inclusive; whereas the final deflection is somewhat higher. Accordingly, a larger number of these springs must be used to restore the main spring to the desired initial height under static load conditions, resulting in a correspondingly much greater force exerted under maximum deflection conditions, which is providing the vehicle with a comparatively hard-riding property.

It is evident from a comparison between curves R, T and S that the auxiliary springs shown in Figs. 1 to 8, inclusive, the characteristics of which are represented in curve R, exerts a much greater initial spring force, and a very favorable maximum spring force, with a spring that has a thickness of five hundredths of an inch and is three quarters of an inch wide. Thus, much more desirable results are achieved with a spring using less material than in the springs represented by curves S and T. Fewer springs 20 are required for application to the main spring 16.

The auxiliary spring 20 shown in Figs. 1 to 8, inclusive, has a comparatively small over-all lateral distance, extending from the outer ends of the saddles 24, 28 to the outer end of the central web 21. When installed on the main spring 16 of the vehicle, the central web 21 projects outwardly beyond the main spring by only a small distance and avoids interference with other portions of the vehicle. Its installation can be made readily merely by depressing the saddle bearing portions 24, 28 toward each other and slipping these members between adjacent coils 25, 29, whereupon the saddles are released, springing outwardly into firm bearing engagement with the coils 25, 29. The grip between the saddles and coils is such that the spring 20 will not shift arcuately around the main spring 16. Once installed it will remain in its appropriate assembled position.

In view of the compactness of the spring 20 it can also be readily installed interiorly of the main helical spring 16. The saddles 24, 28 are deflected toward each other by use of a suitable tool, such as a pair of pliers, and the auxiliary spring device is then shifted between adjacent coils 25, 29 until its main portion is disposed inwardly of the main spring 16, whereupon it can be turned into appropriate relation and released, its saddles 24, 28 snapping around adjacent spring coils 25, 29, with the inner arm portions 22, 26 and the central web 21 disposed fully within the main spring 16. Here again, the relatively small lateral dimensions of the spring 20 permits its installation interiorly of the main spring 16 without interference with any devices that might be disposed within the main spring, such as a shock absorber.

In actual use of the springs 20 in automobiles, it is found that they not only produce the compensating effect described above, without introducing a hard-riding property to the vehicle but they also create a damping or shock absorbing effect in the automobile suspension system. During operation of the automobile over a road, the load on the spring suspension system varies or oscillates. Relieving of the load, with the compensating springs 20 present, results in a return of the spring system to a position of equilibrium in a comparatively short time.

An auxiliary spring 20 of a given size may be used with coil springs 16 made from round spring stocks of different diameters. As a result, if the radius of the coil spring stock is much smaller than the radius of the saddle portions 24, 28, the auxiliary spring might tend toward looseness during oscillation of the coil spring and creep around the spring turns 25, 29 from its position of installation. Such creeping tendency can be prevented by magnetizing the auxiliary spring, constituting it as a permanent magnet. Its saddle portions will, therefore, be held magnetically to the turns of the coil springs seated therein, the magnetic force of attraction aiding the spring force of the auxiliary spring 20 against the turns 25, 29 of the coil spring to retain the auxiliary spring at its assembled position on the coil spring.

The form of invention disclosed in Figs. 12, 13 and 14 illustrates another manner of preventing loosening or creeping of an auxiliary spring 20a around the coil spring. The web 21a of the auxiliary spring has a slight twist, resulting in the saddle portions 24a, 28a being turned or displaced from longitudinal alignment with each other. When the auxiliary spring 20a is installed on the coil spring 16, the web 21a is untwisted to some extent and the saddles forced toward a position of alignment. However, the web 21a then tends to return to its pre-set twisted shape, turning or rotating the saddles 24a, 28a toward their initial position of disalignment and, as a result, causing the saddles to grip the spring turns 25, 29. Such gripping action will occur against the turns 25, 29 of coil springs of different diameter stocks, enabling a particular auxiliary spring 21a to be mounted on coil springs of different stock diameters with assurance that the auxiliary spring will not become loose or creep around the coil spring turns.

The inventor claims:

1. In a suspension mechanism for a vehicle including a coil spring having a plurality of turns for supporting part of the vehicle load, the combination therewith of a leaf spring comprising opposed arms normally spaced from each other and providing concave bearing portions extending between and engaging adjacent turns to exert a spring force tending to separate said turns, and a deflectable web integral with said arms and extending lengthwise of said coil spring and lying out of the paths of said adjacent turns.

2. In a suspension mechanism for a vehicle including a coil spring having a plurality of turns for supporting part of the vehicle load, the combination therewith of a leaf spring comprising opposed arms normally spaced from each other and extending between and engaging adjacent turns to exert a spring force tending to separate said turns, and a web integral with said arms and extending lengthwise of said coil spring, said web being concave in a direction facing away from said arms when said leaf spring is under relatively light load and being deflectable through a straight position to a convex shape facing in said direction as the load on said leaf spring increases and said arms shift toward each other.

3. In a suspension mechanism for a vehicle including a coil spring having a plurality of turns for supporting part of the vehicle load, the combination therewith of a leaf spring comprising arms having opposed seat portions normally spaced from each other and receiving adjacent turns of said coil spring to exert a spring force tending to separate said turns, and a central web between and integral with said arms and extending lengthwise of said coil spring, said web being concave in a direction facing away from said arm when said leaf spring is under relatively light load and being deflectable through a straight position to a convex shape facing in said direction as the load on said leaf spring increases and said arms shift toward each other.

4. In a suspension mechanism for a vehicle including a coil spring having a plurality of turns for supporting part of the vehicle load, the combination therewith of a leaf spring comprising arms having terminal saddle portions normally spaced from each other and facing in opposite directions and receiving adjacent turns of said coil spring to exert a spring force tending to separate said turns, and a central web between and integral with said arms and extending lengthwise of said coil spring, said web being concave in a direction facing away from said arm when said leaf spring is under relatively light load and being deflectable through a straight position to a convex shape facing in said direction as the load on said leaf spring increases and said arms shift toward each other.

5. In a suspension mechanism for a vehicle including a coil spring having a plurality of turns for supporting part of the vehicle load, the combination therewith of a leaf spring comprising arms having terminal saddle portions normally spaced from each other and facing in opposite directions and receiving adjacent turns of said coil spring to exert a spring force tending to separate said turns, and a central web between and integral with said arms and extending lengthwise of said coil spring, said web being concave in a direction facing away from said arm when said leaf spring is under relatively light load and being deflectable through a straight position to a convex shape facing in said direction as the load on said leaf spring increases and said arms shift toward each other; said central web being disposed externally of said coil spring.

6. In a suspension mechanism for a vehicle including a coil spring having a plurality of turns for supporting part of the vehicle load, the combination therewith of a leaf spring comprising arms having terminal saddle portions normally spaced from each other and facing in opposite directions and receiving adjacent turns of said coil spring to exert a spring force tending to separate said turns, and a central web between and integral with said arms and extending lengthwise of said coil spring, said web being concave in a direction facing away from said arm when said leaf spring is under relatively light load and being deflectable through a straight position to a convex shape facing in said direction as the load on said leaf spring increases and said arms shift toward each other; said central web being disposed internally of said coil spring.

7. In a suspension mechanism for a vehicle including a coil spring having a plurality of turns for supporting part of the vehicle load, the combination therewith of a leaf spring comprising arms having terminal saddle portions normally spaced from each other and facing in opposite directions and receiving adjacent turns of said coil spring to exert a spring force tending to separate said turns, and a central web between and integral with said arms and extending lengthwise of said coil spring, said web being concave in a direction facing away from said arm when said leaf spring is under relatively light load and being deflectable through a straight position to a convex shape facing in said direction as the load on said leaf spring increases and said arms shift toward each other, said web having a twist to disalign said saddle portions from each other, whereby said saddle portions grip said adjacent turns.

8. The invention as set forth in claim 1 wherein said web is curved.

9. The invention as set forth in claim 1 wherein said web is concave in a direction facing away from said arms.

10. The invention as set forth in claim 1 wherein said web is convex in a direction facing away from said arms.

References Cited in the file of this patent

UNITED STATES PATENTS

| | | |
|---|---|---|
| 870,106 | Jones | Nov. 5, 1907 |
| 1,546,164 | Bluhm | July 14, 1925 |
| 1,714,779 | Harris | May 28, 1929 |
| 2,183,100 | Holland | Dec. 12, 1939 |

FOREIGN PATENTS

| | | |
|---|---|---|
| 16,990 | Great Britain | of 1901 |
| 173,090 | Austria | Nov. 10, 1952 |